United States Patent [19]

Matyl et al.

[11] 4,241,593
[45] Dec. 30, 1980

[54] ELASTIC SHAFT COUPLING

[75] Inventors: Franz Matyl; Johann Klecker; Guillermo Sanguino-Alvarez, all of Munich, Fed. Rep. of Germany

[73] Assignee: Bayerische Motoren Werke Aktiengesellschaft, Fed. Rep. of Germany

[21] Appl. No.: 876,106

[22] Filed: Feb. 8, 1978

[30] Foreign Application Priority Data

Feb. 9, 1977 [DE] Fed. Rep. of Germany ....... 2705295

[51] Int. Cl.³ ............................................... F16D 3/64
[52] U.S. Cl. .................... 64/14; 64/27 NM; 403/337
[58] Field of Search .................. 64/14, 27 NM, 18, 7, 64/8, 21; 403/337

[56] References Cited

U.S. PATENT DOCUMENTS

| | | | |
|---|---|---|---|
| 1,548,629 | 8/1925 | Pfander | 64/14 |
| 1,950,207 | 3/1934 | Anderson | 64/18 |
| 2,030,788 | 2/1936 | Geyer | 64/14 |
| 2,200,641 | 5/1940 | Ricefield | 64/14 |
| 2,208,314 | 7/1940 | Snyder | 64/27 NM |
| 2,326,976 | 8/1943 | Schmidt | 64/14 |
| 2,412,487 | 12/1946 | Amley | 403/337 |
| 2,659,219 | 11/1953 | Mosso | 64/14 |
| 3,293,882 | 12/1966 | Boschi | 64/14 |
| 3,613,398 | 10/1971 | Hasegama | 64/21 |
| 3,713,676 | 1/1973 | Culstrom | 403/337 |

FOREIGN PATENT DOCUMENTS

| | | | |
|---|---|---|---|
| 183942 | 11/1905 | Fed. Rep. of Germany | 64/14 |
| 2550560 | 12/1977 | Fed. Rep. of Germany | 64/14 |

Primary Examiner—Ira S. Lazarus
Assistant Examiner—Magdalen Moy
Attorney, Agent, or Firm—Craig & Antonelli

[57] ABSTRACT

An elastic shaft coupling, especially for motor vehicles, with two coupling parts each adapted to be connected with a shaft end, which are non-rotatably connected with each other under interposition of a rubber-elastic layer; one or both coupling parts are provided with approximately axially directed fastening tongues uniformly distributed at the circumference which are adapted to be screwed together with a correspondingly directed centering surface that is provided at the shaft itself or at a fastening flange adapted to be connected with the shaft.

14 Claims, 7 Drawing Figures

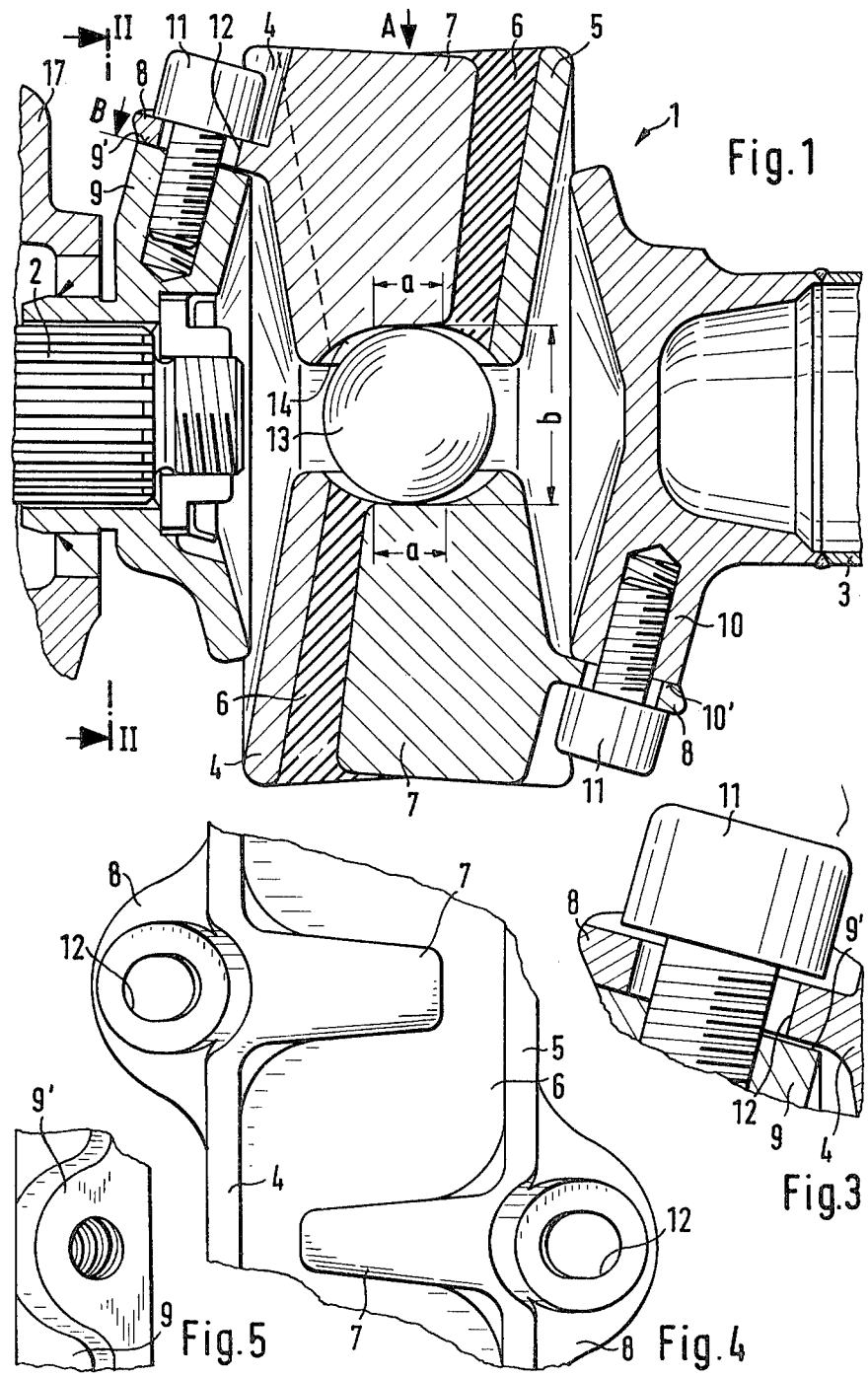

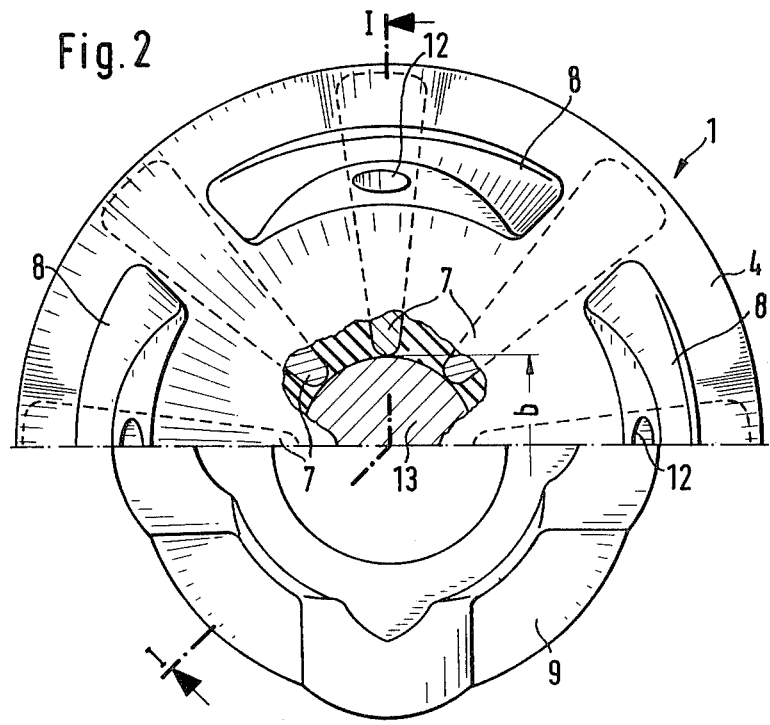
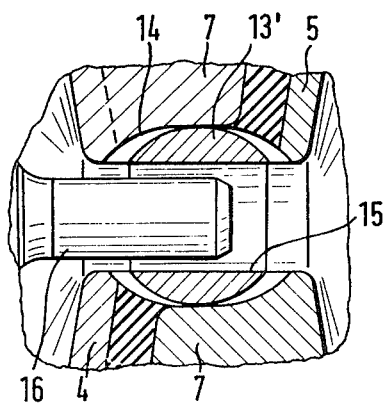
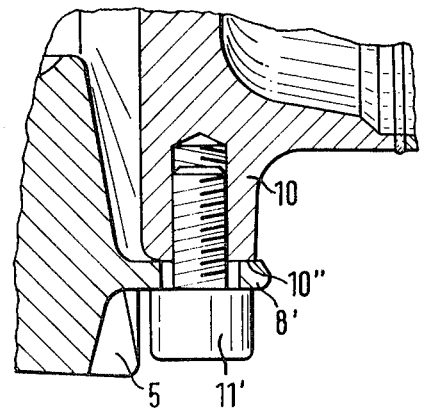

ELASTIC SHAFT COUPLING

The present invention relates to an elastic shaft coupling, especially for motor vehicles, with two coupling parts each adapted to be connected with a shaft end, which are in non-rotational connection with each other by interposition of a rubber-elastic layer.

Such an elastic shaft coupling is disclosed, for example, in the German Gebrauchsmuster No. 69 30 864, whereby the rubber-elastic layer constructed approximately as ring disk is connected with a respective one of the two clutch parts by means of bolts or screws uniformly distributed over the circumference. Spacer sleeves are inserted for that purpose into the rubber-elastic layer which are traversed by the fastening bolts. The radial clearance required for assembly reasons between the outer diameter and the through-bore of the spacer sleeves can lead to a center offset of the two clutch parts during the tightening of the fastening bolts, from which imbalances result. Furthermore, dimensional inaccuracies present at the bolt hole circle and/or the spacing of the holes for the fastening bolts may lead to a center offset. If the spacer sleeves are only slightly different in length, axial run-out occurs at the shaft coupling, which has, as a consequence, imbalances. Finally, a disadvantage of the prior art shaft coupling resides in that the spacer sleeves can rotate during the tightening of the fastening bolts whereby stresses occur in the rubber-elastic layer.

It is the aim of the present invention to provide an elastic shaft coupling of the aforementioned type, during the assembly of which a center offset is precluded and which therebeyond does not entail the aforementioned disadvantages.

The underlying problems are solved according to the present invention in that at least one clutch part includes approximately axially directed fastening tongues distributed uniformly at the circumference which are adapted to be threadably connected with a correspondingly directed centering surface, whereby the centering surface is provided at the shaft itself or at a fastening flange adapted to be connected with the shaft.

The bolts provided for the threaded connection of the coupling parts to the shaft or to the fastening flange are arranged essentially transversely to the longitudinal axis of the coupling part. As a result thereof, very short bolts can be used advantageously which additionally can be installed in a simple and time-saving manner. An advantage further resides in the present invention also in that as a result of the accurate centering of the shaft coupling, the balance quality attained during the balancing on the balancing machine remains preserved essentially also in the installed condition. The clutch parts can be manufactured in a rational manner of light metal by the die-casting process and can be assembled without further mechanical machining as also screwed together with the shaft ends which is very economical especially with a large series manufacture.

Provision is made in one embodiment of the present invention to incline the fastening tongues in the outward direction approximately 15° with respect to the longitudinal axis of the shaft coupling.

Accordingly, it is an object of the present invention to provide an elastic shaft coupling which avoids by simple means the aforementioned shortcomings and drawbacks encountered in the prior art.

Another object of the present invention resides in a shaft coupling which minimizes the danger of imbalances due to dimensional inaccuracies in the parts thereof.

A further object of the present invention resides in an elastic shaft coupling, in which undesirable stresses in the rubber-elastic layer are effectively prevented.

Still a further object of the present invention resides in an elastic shaft coupling in which a center offset during the assembly is reliably precluded.

Another object of the present invention resides in a shaft coupling which can be assembled and installed in a simple and time-saving manner.

A further object of the present invention resides in an elastic shaft coupling in which the balance quality obtained during the balancing on the balancing machine remains preserved when the shaft coupling is installed into the vehicle.

Still another object of the present invention resides in an elastic shaft coupling of the type described above which can be manufactured in a rational and economic manner and installed with great ease.

These and other objects, features and advantages of the present invention will become more apparent from the following description when taken in connection with the accompanying drawing which shows, for purposes of illustration only, several embodiments in accordance with the present invention and wherein:

FIG. 1 is a longitudinal cross-sectional view through an elastic shaft coupling in accordance with the present invention taken along line I—I in FIG. 2;

FIG. 2 is a cross-sectional view taken along line II—II of FIG. 1, however, without fastening flange;

FIG. 3 is a partial cross-sectional view, on an enlarged scale, of certain details of FIG. 1;

FIG. 4 is a partial elevational view, taken in the direction of arrow A of FIG. 1, however, without bolts;

FIG. 5 is a partial elevational view, taken in the direction of arrow B of FIG. 1;

FIG. 6 is a partial cross-sectional view, similar to FIG. 1, through a slightly modified embodiment of an elastic shaft coupling in accordance with the present invention; and FIG. 7 is a partial cross-sectional view through a further slightly modified embodiment of an elastic shaft coupling in accordance with the present invention.

Referring now to the drawing wherein like reference numerals are used throughout the various views to designate like parts, the elastic shaft coupling generally designated by reference numeral 1 which is illustrated in FIG. 1, serves for the non-rotatable connection of the shafts 2 and 3 and consists of two coupling parts 4 and 5 which are connected by a rubber-elastic layer 6 that is vulcanized-in between the coupling parts 4 and 5. The coupling parts 4 and 5 are each provided with four radially directed entrainment ribs 7 partially overlapping one another, which are in form-locking engagement with one another by the interposition of the rubber-elastic layer 6, as a result of which the non-rotatable connection is assured.

The two coupling parts 4 and 5 are each provided with four fastening tongues 8 uniformly distributed over the circumference which in relation to the longitudinal center axis of the shaft coupling 1 are each inclined outwardly by 15°. These fastening tongues 8 are each provided with an elongated aperture 12 whose center line extends, as viewed in plan view, corresponding to the longitudinal center line of the shaft 2, 3. The shafts 2 and 3 are equipped at their ends with a fastening flange 9 and 10, respectively, whose outer circumference is constructed section-wise as centering surface 9' and 10'. The centering surfaces 9' and 10' are inclined with respect to the center longitudinal axis of the fastening flange 9 and 10 by 15° 20' (clearly recognizable in FIG. 3). The centering surface 9', 10' which is more strongly inclined by 20' than the fastening tongues 8, contributes to the fact that during the bolting together of the coupling parts 4 and 5 with the fastening flanges 9 and 10 by means of the bolts 11, an accurate centering of the shafts 2 and 3 to one another is achieved, whereby the assembly takes place as follows: Since the shaft 2 is received fixed at the vehicle body by the transmission 17, at first the shaft coupling 1 with the fastening tongues 8 of the coupling part 4 is arranged at the centering surface 9' of the fastening flange 9, a bolt 11 is then extended through the elongated aperture 12 and is partly screwed into the internal thread provided at the fastening flange 9 so that the coupling part 4 is adjusted and aligned in relation to the hole spacing of the internally threaded bores provided for the bolts 11 in the fastening flange 9. Thereupon, an axially directed slight blow is applied onto the opposite end of the shaft coupling 1, as a result of which the fastening tongues 8 are each bent outwardly by the provided angular difference of 20' and as a result thereof abut flush at the centering surface 9'. Thereafter all of the bolts 11 can be screwed-in and tightened. The coupling part 5 is assembled in a completely identical manner at the shaft 3, whereby only the axially directed blow is applied to the free end thereof. During the connection of the coupling parts 4 and 5 with the fastening flanges 9 and 10, no radial play can occur in any case so that an exact centering exists between the joined parts and no imbalance or at most only a relatively slight imbalance exists, and this is true even with repeated assembly and disassembly of the shaft coupling 1. The coupling parts 4 and 5 may be manufactured by the die-casting process and can be assembled without further mechanical after-machining. It is assured by the elongated apertures 12 that the parts 4, 5, 9 and 10 to be joined are adapted to be screwed together without after-finishing also with any diameter and/or conicity tolerances that might possibly be present.

As shown in FIG. 6, the fastening tongues 8' may also each extend parallel to the axis of rotation of the coupling parts 4 and/or 5 whereby the coordinated centering surfaces at the fastening flange 9 and 10 are constructed cylindrical. During the tightening of the screws or bolts 11', the fastening tongues 8' are bent in the direction toward the cylindrical centering surface 10''.

It can be seen without difficulty from FIG. 4 that the coupling parts 4 and 5 are each symmetrical and therefore can be made by the use of a single die-casting mold.

In order to prevent the radial displacement of the connected coupling parts 4 and 5 with respect to one another, a ball 13 is arranged centrally, on which the individual entrainment ribs 7 are supported as shown in FIGS. 1 and 2. The aperture 14 accommodating the ball 13 and provided at each respective entrainment rib 7, has within the area of the free end of the entrainment rib 7 a rectilinearly extending section a (FIG. 1) so that the ball 13 is axially displaceable with slight distance changes of the coupling parts 4 and 5 within the scope of the elasticity of the rubber-elastic layer 6. The distance b within the area of two radially oppositely disposed apertures 14 is slightly smaller than the diameter of the ball 13. It is achieved thereby that during the joining of the coupling parts 4 and 5 the ball 13 previously arranged at the free ends of the entrainment ribs 7 is pressed against the entrainment ribs 7 in such a manner that it causes at the respective contact places a slight plastic deformation and as a result thereof the two coupling parts 4 and 5 are radially fixed force-lockingly. Subsequently, the rubber-elastic layer 6 is installed.

The ball 13' illustrated in FIG. 7 is provided with a through-bore 15 whereby the elastic shaft coupling 1 is adapted to be installed also at a transmission 17 provided with a centering pin 16 without requiring any structural changes. This is desirable in case of repair if, for example, during the exchange of the shaft coupling, the transmission shaft has a centering pin 16 as is provided, for example, with the coupling according to the German Gebrauchsmuster No. 69 30 864.

Since the elastic shaft coupling 1 has a defined axis of rotation, it can be balanced in an advantageous manner as an individual part. The balance quality achieved in that connection on the balancing machine can always be reproducibly transferred during the installation of the shaft coupling 1. Of course, the elastic shaft coupling 1 may also be balanced together with the (universal joint) shaft 3 whereby the shaft coupling 1 is installed in a reverse sequence from that described.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An elastic shaft coupling, comprising two coupling means each adapted to be connected with a shaft end under cooperation of respective centering surface means, said two coupling means being non-rotatably connected with each other by interposition of a rubber-elastic layer means, characterized in that the centering surface means of at least one coupling means includes approximately axially directed fastening tongue means substantially uniformly distributed over the circumference, said fastening tongue means being adapted to cooperate with and be threadably connected with a correspondingly directed centering surface means, said correspondingly directed centering surface means being non-rotatable with the respective shaft end, and wherein the fastening tongue means are inclined outwardly with respect to the center longitudinal axis of the shaft coupling by about 15°, and wherein said correspondingly directed centering surface means cooperating with the fastening tongue means is more strongly inclined with respect to the longitudinal center axis than the fastening tongue means.

2. An elastic shaft coupling according to claim 1, characterized in that said correspondingly directed centering surface means is inclined more strongly with respect to the longitudinal center axis by about 20' than the fastening tongue means.

3. An elastic shaft coupling according to claim 1, characterized in that the fastening tongue means are each provided with an aperture.

4. An elastic shaft coupling according to claim 3, characterized in that the aperture is constructed as an elongated aperture whose center line extends in plan view substantially corresponding to the center longitudinal axis of the shaft.

5. An elastic shaft coupling according to claim 4, whose coupling means include radially directed entrainment rib means axially partly overlapping one another, characterized in that the coupling means are secured against mutual radial displacement by a centrally arranged support body means in contact with the individual entrainment rib means.

6. An elastic shaft coupling according to claim 5, characterized in that the support body means is a ball and in that the entrainment rib means are each provided with an aperture means for the accommodation of the ball.

7. An elastic shaft coupling according to claim 6, characterized in that each aperture means has a substantially rectilinear section provided within the area of the free end of the entrainment rib means.

8. An elastic shaft coupling according to claim 7, characterized in that the ball is provided with a through-bore.

9. An elastic shaft coupling according to claim 7, characterized in that said correspondingly directed centering surface means is inclined more strongly with respect to the longitudinal center axis by about 20' than the fastening tongue means.

10. An elastic shaft coupling according to claim 7, characterized in that said correspondingly directed centering surface means is provided at the shaft itself.

11. An elastic shaft coupling according to claim 7, characterized in that said correspondingly centering surface means is provided on a fastening flange means adapted to be connected with a shaft.

12. An elastic shaft coupling comprising two coupling means each adapted to be connected with a shaft end under cooperation of respective centering surface means, said two coupling means being non-rotatably connected with each other by interposition of a rubber-elastic layer means, characterized in that the centering surface means of at least one coupling means includes approximately axially directed fastening tongue means substantially uniformly distributed over the circumference, said fastening tongue means being adapted to cooperate with and be threadably connected with a correspondingly directed centering surface means, said correspondingly directed centering surface means being non-rotatable with the respective shaft end, and characterized in that the fastening tongue means are each provided with an aperture which is constructed as an elongated aperture whose center line extends in plan view substantially corresponding to the center longitudinal axis of the shaft.

13. An elastic shaft coupling, comprising two coupling means each adapted to be connected with a shaft end under cooperation of respective centering surface means, said two coupling means being non-rotatably connected with each other by interposition of a rubber-elastic layer means, characterized in that the centering surface means of at least one coupling means includes approximately axially directed fastening tongue means substantially uniformly distributed over the circumference, said fastening tongue means being adapted to cooperate with and be threadably connected with a correspondingly directed centering surface means, said correspondingly directed centering surface means being non-rotatable with the respective shaft end, and wherein said coupling means include radially directed entrainment rib means axially partly overlapping one another characterized in that the coupling means are secured against mutual radial displacement by a centrally arranged support body means in contact with the individual entrainment rib means, wherein said support body means is a ball and said entrainment rib means are each provided with an aperture means for the accommodation of the ball and wherein each aperture means has a substantially rectilinear section provided within the area of the free end of the entrainment rib means.

14. An elastic shaft coupling according to claim 13, characterized in that the ball is provided with a through-bore.

* * * * *